US008345666B2

(12) United States Patent
Clair et al.

(10) Patent No.: US 8,345,666 B2
(45) Date of Patent: Jan. 1, 2013

(54) REDIRECTING A CALL BY A CIRCUIT SWITCHED NETWORK TO AN INTERNET PROTOCOL MULTIMEDIA SUBSYSTEM (IMS) NETWORK

(75) Inventors: Robin P Clair, Flower Mound, TX (US); Priscilla Lau, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 353 days.

(21) Appl. No.: 12/637,469

(22) Filed: Dec. 14, 2009

(65) Prior Publication Data

US 2010/0278125 A1 Nov. 4, 2010

Related U.S. Application Data

(60) Provisional application No. 61/173,903, filed on Apr. 29, 2009.

(51) Int. Cl.
  *H04L 12/66* (2006.01)
(52) U.S. Cl. ..................... 370/352; 455/414.1
(58) Field of Classification Search .................. None
See application file for complete search history.

(56) References Cited

U.S. PATENT DOCUMENTS

| 7,590,678 | B2 * | 9/2009 | Jaaskela et al. | 709/200 |
| 8,027,456 | B1 * | 9/2011 | Zhang et al. | 379/257 |
| 2008/0317001 | A1 * | 12/2008 | Jackson | 370/352 |
| 2010/0008353 | A1 * | 1/2010 | Li | 370/352 |
| 2010/0161325 | A1 * | 6/2010 | Hellwig et al. | 704/229 |

OTHER PUBLICATIONS

"Voice Call Continuity between IMS and Circuit Switched Systems", 3rd Generation Partnership Project 2 "3GPP2", 3GPP2 X.50042-A, Version 1.0, Aug. 2008.

* cited by examiner

*Primary Examiner* — Jianye Wu
*Assistant Examiner* — Wanda Z Russell

(57) ABSTRACT

A device receives a call for a user device associated with an Internet protocol multimedia subsystem (IMS) network, where the call includes a mobile directory number (MDN) associated with the user device, and retrieves, from a home location register (HLR), an address of a wireless intelligent network (WIN) termination trigger service control point (SCP). The device sends, to the WIN termination trigger SCP, a first message that includes the MDN, receives, from the WIN termination trigger SCP, a second message that includes steering digits as a prefix to the MDN, and generates a third message that includes a called party number set to the MDN and omits the steering digits. The device also routes, based on the steering digits, the third message to a media gateway control function/media gateway (MGCF/MGW) of the IMS network, where the MGCF/MGW further processes the call.

24 Claims, 8 Drawing Sheets

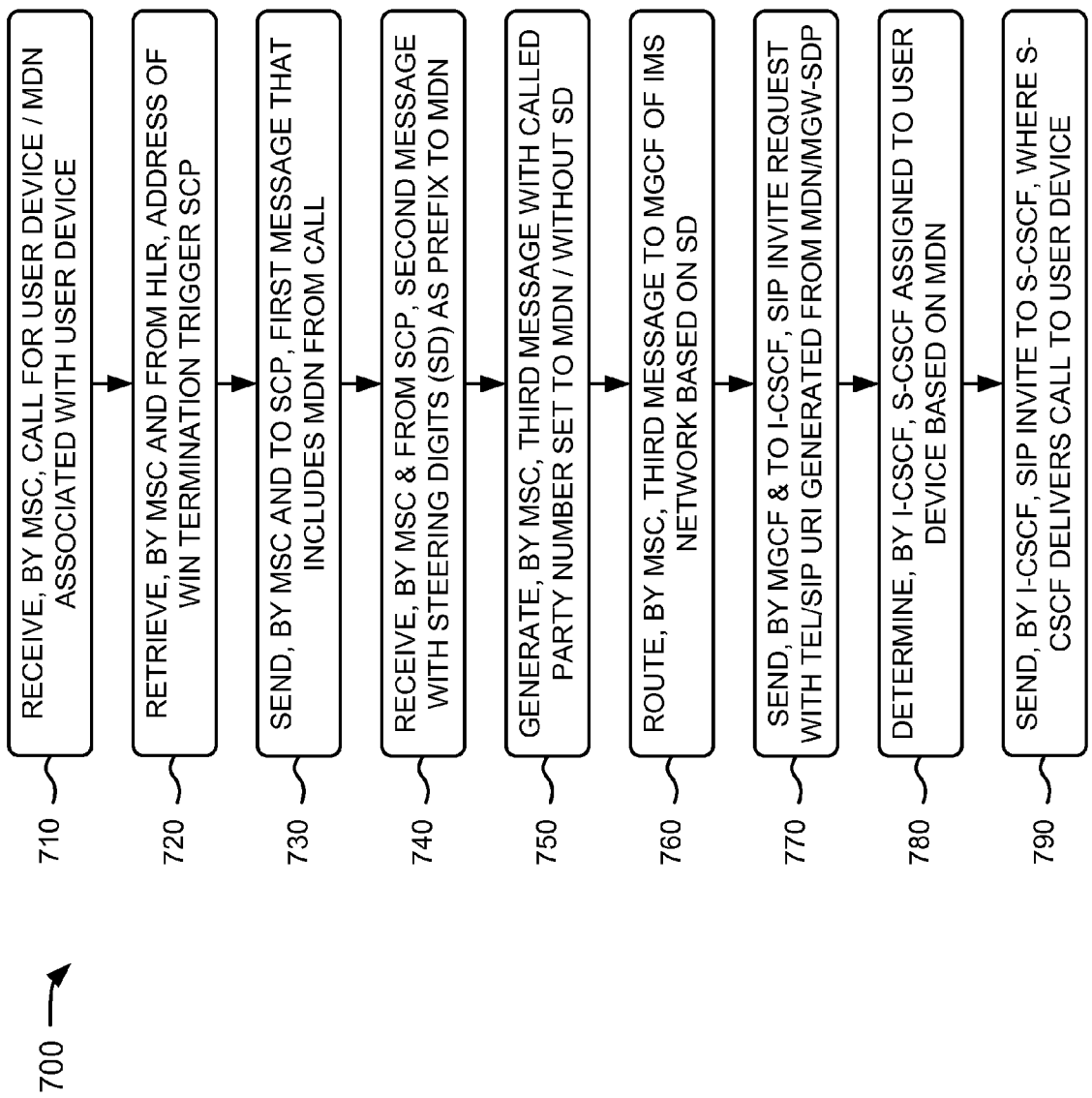

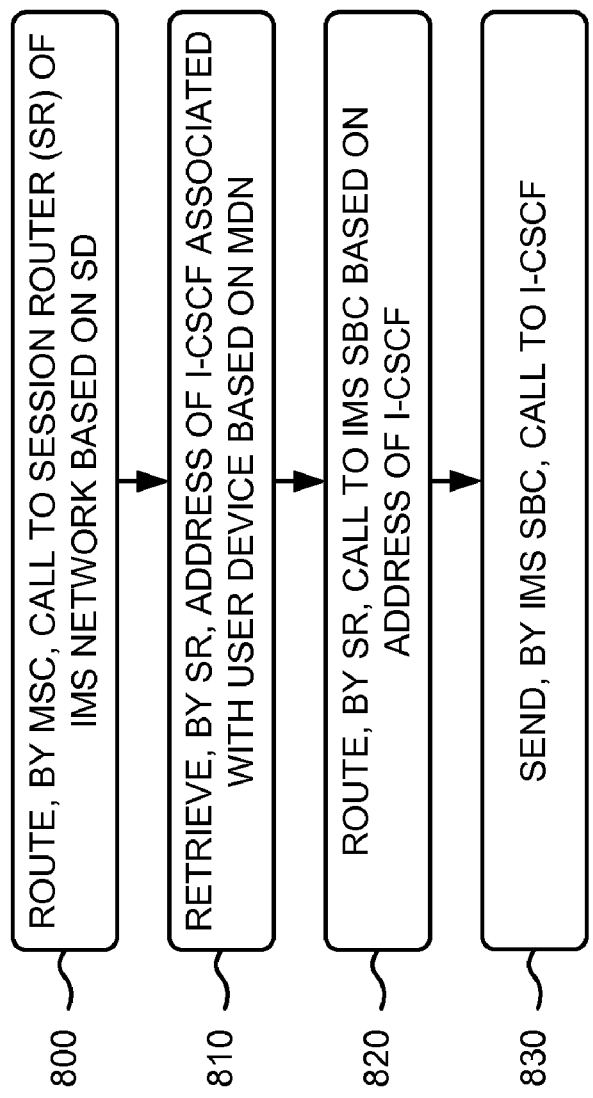

REDIRECTING A CALL BY A CIRCUIT SWITCHED NETWORK TO AN INTERNET PROTOCOL MULTIMEDIA SUBSYSTEM (IMS) NETWORK

RELATED APPLICATION

This application claims priority under 35 U.S.C. §119 based on U.S. Provisional Patent Application No. 61/173,903, filed Apr. 29, 2009, the disclosure of which is incorporated by reference herein in its entirety.

BACKGROUND

The current standard method (e.g., defined in X.S0042-A v1.0 by the Third Generation Partnership Project 2 (3GGP2)) allowing assignment of a mobile directory number (MDN) (e.g., homed to a mobile switching center (MSC) of a code division multiple access (CDMA) network) to a mobile served by an Internet protocol (IP) multimedia subsystem (IMS) network requires a voice call continuity (VCC) application server (AS) to support a wireless intelligent network (WIN) trigger. However, this method cannot be implemented if the VCC AS does not support a WIN termination trigger message (i.e., an Analyze Information Invoke message as specified in X.S0042-A v1.0) or if there is no VCC AS deployed in the IMS network.

BRIEF DESCRIPTION OF THE DRAWINGS

FIGS. 7 and 8 are flow charts of an exemplary process for redirecting a MDN (e.g., homed to a circuit switched network) to an IMS network according to implementations described herein.

DETAILED DESCRIPTION OF PREFERRED EMBODIMENTS

Figure 1:
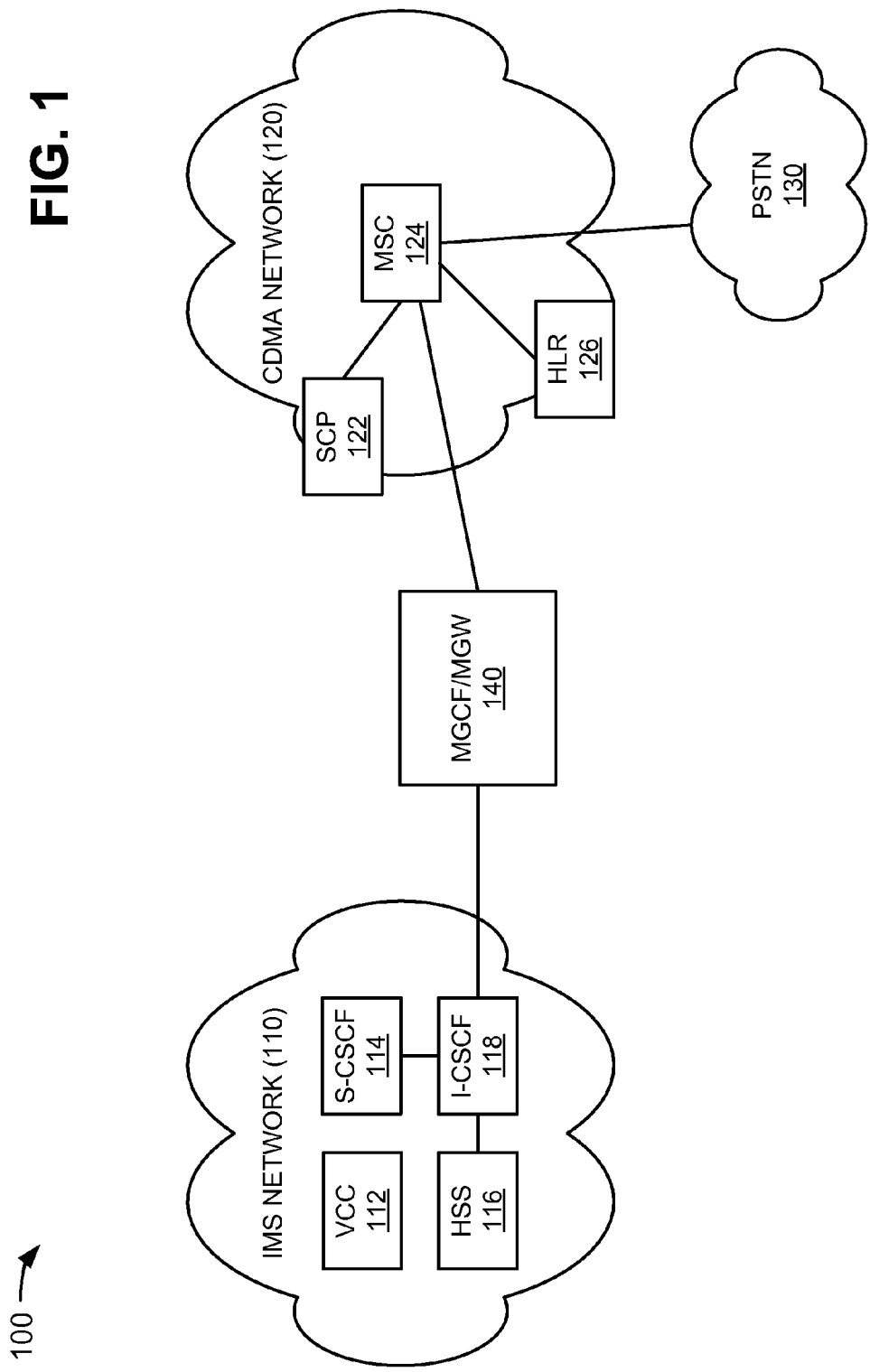
FIG. 1 is a diagram of an exemplary network in which systems and/or methods described herein may be implemented.

The following detailed description refers to the accompanying drawings. The same reference numbers in different drawings may identify the same or similar elements. Also, the following detailed description does not limit the invention.

Implementations described herein may provide systems and/or methods that redirect a call to a MDN (e.g., homed to a circuit switched network) to an IMS network using WIN triggers. In one exemplary implementation, a MSC, associated with a circuit switched network, may receive a call to a MDN that is homed to the MSC (e.g., the MSC appears as a termination switch for the telephone number) and is assigned to a user device (e.g., a telephone, a mobile phone, a wireless device, etc.) served by an IMS network. The MSC may retrieve, from a home location register (HLR), an address of a WIN termination trigger service control point (SCP) based on the MDN, and may provide a first message (e.g., that includes the MDN) to the SCP. The MSC may receive, from the SPC, a second message that includes steering digits as a prefix to the MDN, and may generate a third message that includes a called party number set to the MDN and does not include the steering digits. The MSC may route the third message to a media gateway control function/media gateway (MGCF/MGW) of the IMS network based on the steering digits, and the MGCF/MGW may send a session initiation protocol (SIP) invite message (e.g., that includes a request uniform resource identifier (R-URI) containing a telephone (TEL) URI or a SIP URI generated from the MDN and also contains a session description protocol (SDP) specifying media characteristics supported by a media gateway (MGW) for a bearer connection for the call) to an interrogating call session control function (I-CSCF) of the IMS network. The I-CSCF may determine, based on the MDN, a serving-CSCF (S-CSCF) (e.g., of the IMS network) assigned to the user device, and may send the SIP invite message to the S-CSCF. The S-CSCF may setup the call to the user device.

As used herein, the terms "telephone number," "mobile directory number (MDN)," "mobile station integrated services digital network (ISDN) number (MSISDN)" and "mobile station international ISDN number" are intended to be used interchangeably.

The systems and/or methods described herein may not require a VCC AS to support a WIN termination trigger message (i.e., the Analyze Information Invoke message) which is used to pass an original called party number to the VCC AS ahead of a redirection of the call from the MSC to the IMS network. The systems and/or methods may not cause a WIN SCP to forward a WIN termination trigger message to a VCC AS in an IMS network, but may cause the WIN SCP to provide a response to a MSC. The WIN SCP may return a called party number received in the Analyze Information Invoke message after prefixing the called party number with steering digits as the routing digits that may permit the MSC to route the call to an outgoing trunk group connecting to an appropriate media gateway control function/media gateway (MGCF/MGW) with the original called party number. In the standard method, the WIN SCP passes an IMS routing number (IMRN) from the VCC AS back to the MSC. The systems and/or methods may not require the use of an IMRN to redirect the call from the MSC to the IMS network, where the IMRN may be used as the called party number.

The systems and/or methods may not require a Public Service Identity (PSI) to be provisioned in a home subscriber server (HSS) for the IMRN. Upon receiving a redirected call from the MGCF/MGW, an I-CSCF may query the HSS for the address of a S-CSCF for the original called number instead of the IMRN, and may send the call to the S-CSCF of a user device (of the called party) for call termination, without first going through the VCC AS. A location information request (LIR) message (e.g., sent by the I-CSCF to the HSS) may contain the user device's MDN (i.e., the original called number) instead of the IMRN. With the systems and/or methods, the VCC AS may not reconstruct the call by replacing the IMRN with the original called party number received in the WIN termination trigger message.

FIG. 1 is a diagram of an exemplary network 100 in which systems and/or methods described herein may be implemented. As illustrated, network 100 may include an IMS network 110, a CDMA network 120, a Public Switched Telephone Network (PSTN) 130, and a MGCF/MGW 140. IMS network 110 may include a VCC 112, a S-CSCF 114, a HSS 116, and a I-CSCF 118. CDMA network 120 may include a SCP 122, a MSC 124, and a HLR 126. MGCF/MGW 140 may interconnect IMS network 110 and CDMA network 120. Devices/networks of network 100 may interconnect via wired and/or wireless connections. A single IMS network 110, VCC 112, S-CSCF 114, HSS 116, I-CSCF 118, CDMA network 120, SCP 122, MSC 124, HLR 126, PSTN 130, and MGCF/MGW 140 have been illustrated in FIG. 1 for simplicity. In practice, there may be more IMS networks 110, VCCs 112, S-CSCFs 114, HSSs 116, I-CSCFs 118, CDMA networks 120, SCPs 122, MSCs 124, HLRs 126, PSTNs 130, and MGCF/MGWs 140. Also, in some instances, one or more of the components of network 100 may perform one or more functions described as being performed by another one or more of the components of network 100.

IMS network 110 may include an architectural framework or network (e.g., a telecommunications network) for delivering Internet protocol (IP) multimedia services. In one example, IMS network 110 may also include a proxy-CSCF (P-CSCF) (not shown).

VCC 112 may include one or more server devices, or other types of computation or communication devices, that are capable of supporting voice call continuity (i.e., a service that permits users to move voice calls between a circuit switched (CS) domain and IMS network 110 (e.g., which may be referred to as a multimedia domain (MMD) by the 3GPP2), connected through different IP-connectivity access networks (IPCANs)). VCC 112 may also support domain selection to determine in which network a user is present for call termination. VCC 112 may be omitted for implementations that do not permit IMS users to receive services in the CS domain.

S-CSCF 114 may include one or more server devices, or other types of computation or communication devices, that gather, process, search, and/or provide information in a manner described herein. In one exemplary implementation, S-CSCF 114 may be a central node of a signaling plane for voice over IP (VoIP) calls. S-CSCF 114 may include a SIP server, but may perform session control too. S-CSCF 114 may handle SIP registrations, which allow S-CSCF 114 to bind the user location (e.g., the IP address of a user device), a telephone URI (Tel URI), a SIP URI, and a P-CSCF address. S-CSCF 114 may inspect signaling messages, may decide to which application server(s) (e.g., telephone application servers (TAS) and VCC 112) the SIP message will be forwarded, may provide routing services (e.g., using electronic numbering (ENUM) lookups), may enforce a policy of a network operator, etc.

HSS 116 may include one or more server devices, or other types of computation or communication devices, that gather, process, search, and/or provide information in a manner described herein. In one exemplary implementation, HSS 116 may include a master user database with information that supports devices of IMS network 110 for VoIP calls or other IMS services. HSS 116 may contain subscription-related information (e.g., subscriber profiles), may perform authentication and authorization of a user, and may provide information about a subscriber's location and IP information.

I-CSCF 118 may include one or more server devices, or other types of computation or communication devices, that gather, process, search, and/or provide information in a manner described herein. In one exemplary implementation, I-CSCF 118 may include a SIP function located at an edge of an administrative domain. I-CSCF 118 may include an IP address that is published in a Domain Name System (DNS) of a domain or in an ENUM server for telephone numbers assigned to user devices in IMS network 110, so that remote servers can find I-CSCF 118, and may use the IP address as a forwarding point for SIP signaling messages to this domain.

I-CSCF 118 may query HSS 116 using a Diameter Cx interface to retrieve a user registration status and the assigned S-CSCF address, and may route a SIP invite message to its assigned S-CSCF (e.g., S-CSCF 114).

CDMA network 120 may include a circuit switched network, such as a network that supports mobile telecommunications standards that use CDMA. In one exemplary implementation, CDMA network 120 may include the legacy switched signaling system (1xCS) network.

SCP 122 (or WIN SCP) may include one or more server devices, or other types of computation or communication devices, that gather, process, search, and/or provide information in a manner described herein. In one exemplary implementation, SCP 122 may include a component of an intelligent network (IN) or wireless IN (WIN) telephone system that may be used to control a service. SCP 112 may be deployed using Signaling System #7 (SS7), Sigtran, or SIP technologies, and may query a local or external database and directory. SCP 122, using the information stored in the database, may identify a geographical number to which a call is to be routed. Furthermore, in implementations described herein, a same set of steering digits may be used, regardless of a geographical location associated with a telephone number, for called numbers.

MSC 124 may include one or more server devices, or other types of computation or communication devices, that gather, process, search, and/or provide information in a manner described herein. In one exemplary implementation, MSC 124 may include a primary service delivery node, and may be responsible for handling voice calls and other services (e.g., conference calls, circuit switched data, etc.). MSC 124 may set up and release an end-to-end connection, and may handle mobility and hand-over requirements during a communication (e.g., a call). In one example, MSC 124 may be assigned with telephone number resources (e.g., MDNs) in a "10K" block format of NPA-NXX numbers that indicate that MSC 124 is a terminating (or home) switch. In another example, MSC 124 may be assigned with telephone number resources (MDNs) in a "1K" block format of NPA-NXX-X numbers or an individual NPA-NXX-XXXX number so that calls to these MDNs may be delivered from PSTN 130 to MSC 124 for termination.

HLR 126 may include one or more server devices, or other types of computation or communication devices, that gather, process, search, and/or provide information in a manner described herein. In one exemplary implementation, HLR 126 may include a central database that contains details of each mobile phone subscriber that is authorized to use a circuit switched network (e.g., a GSM or CDMA network). There may be several logical, and physical, HLRs 126 per public land mobile network (PLMN).

PSTN 130 may include a network of the world's public circuit-switched telephone networks. PSTN 130 may include fixed-line analog telephone systems, digital telephone systems, and mobile and fixed telephones.

MGCF/MGW 140 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one exemplary implementation, MGCF/MGW 140 may perform call control protocol conversion between SIP and ISDN user part (ISUP), and may interface with a media plane of a circuit switched network (e.g., CDMA network 120) and an IP network (e.g., IMS network 110).

In one exemplary implementation, a call to a user device (not shown) associated with IMS network 110 may reach MSC 124, and MSC 124 may send a location request (e.g., an ANSI "LOCREQ") message to HLR 126 and may retrieve, based on the MDN of the called party included in the call, a WIN termination trigger SCIP address from HLR 126. Based the retrieved SCIP address, MSC 124 may send an analyze information invoke message (e.g., with a called party number in dialed digits) to SCP 122, and SCP 122 may respond to MSC 124 after prefixing the called party number with steering digits. MSC 124 may send the call to a trunk group (e.g., connected to MGCF/MGW 140) based on the steering digits and after removing the steering digits from the call. MGCF/MGW 140 may convert an ISUP Initial Address Message (IAM) message to a SIP invite message (e.g., with an original called party number included in a R-URI header in either a Tel URI or SIP URI format), and may send the call to I-CSCF 118. I-CSCF 118 may send a LIR message to HSS 116 (e.g., querying for a location of the called party number included in the R-URI header), and HSS 116 may return an address for S-CSCF 114 in a location information answer (LIA) message (e.g., a response to the LIR message). I-CSCF 118 may send, based on the response from HSS 116, the SIP invite message to S-CSCF 114 (e.g., associated with the user device), and S-CSCF 114 may process the call for termination to the user device.

Although FIG. 1 shows exemplary devices/networks of network 100, in other implementations, network 100 may contain fewer, different, differently arranged, or additional device/networks than depicted in FIG. 1. For example, implementations described herein may be applied to Global System for Mobile communication (GSM) networks in addition to or instead of CDMA network 120.

Figure 2:
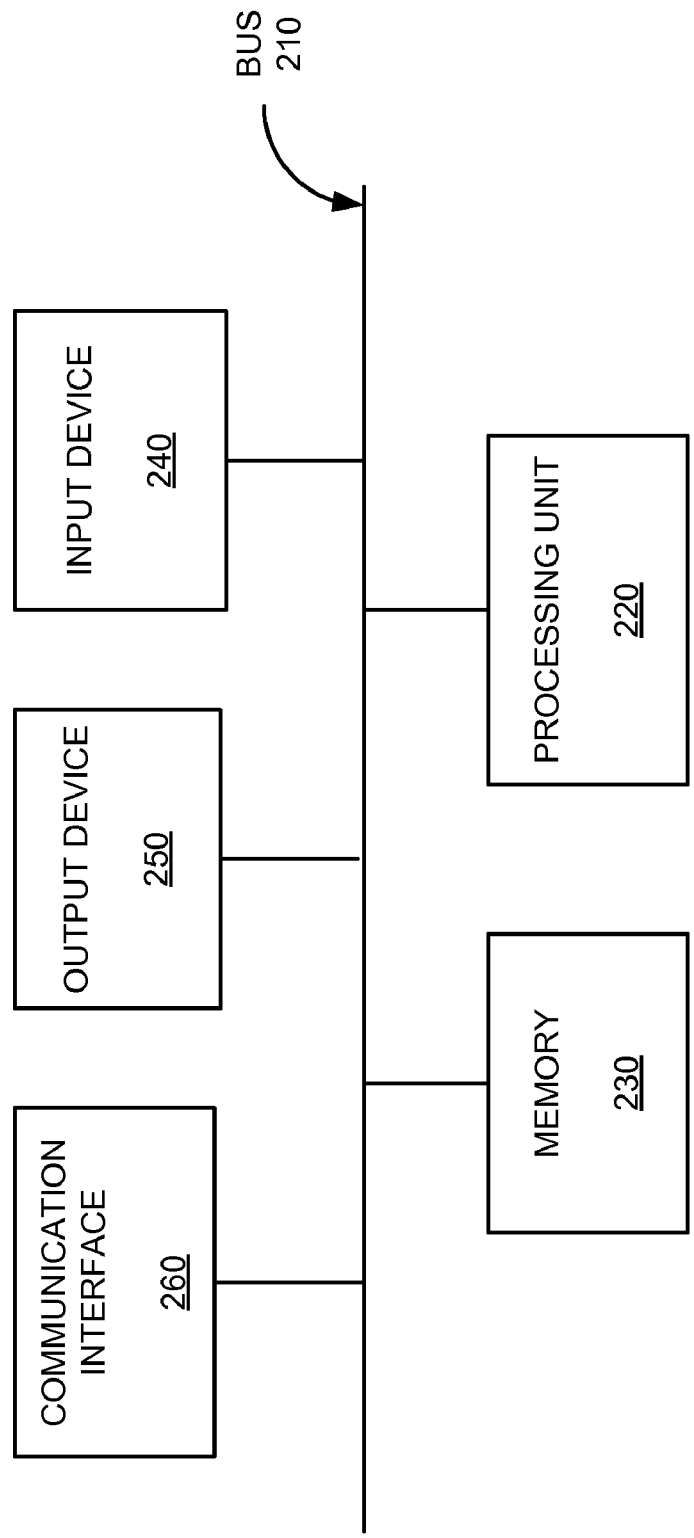
FIG. 2 is a diagram of exemplary components of a device that may correspond to one of the devices of the network depicted in FIG. 1.

FIG. 2 is a diagram of exemplary components of a device 200 that may correspond to one of the devices of network 100. One or more of the devices depicted in FIGS. 3-6 (and described below) may contain comparable configurations. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like. Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
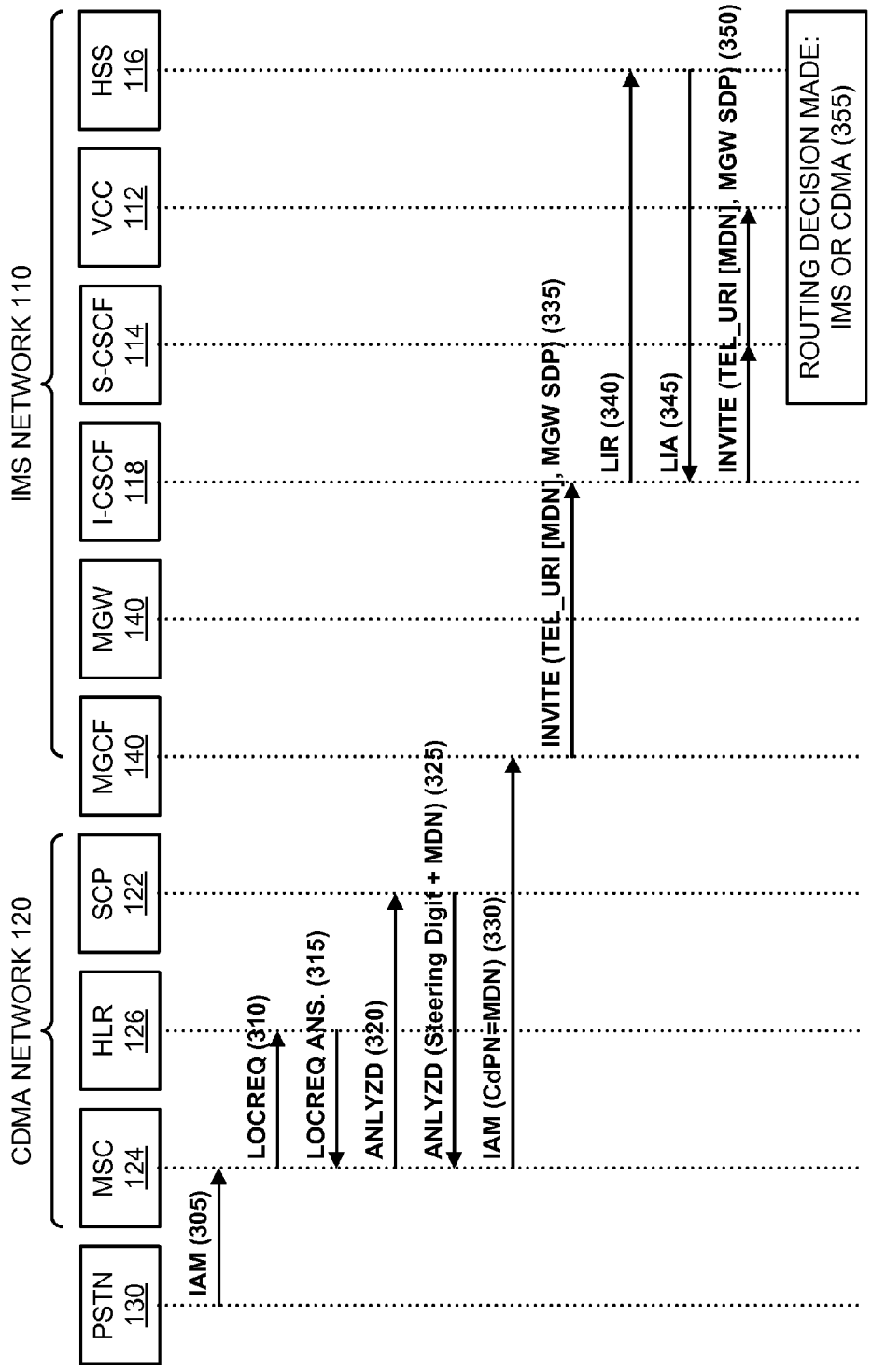
FIG. 3 is a diagram of an exemplary call flow associated with the network illustrated in FIG. 1.

FIG. 3 is a diagram of an exemplary call flow 300 associated with network 100. As illustrated, call flow 300 may include IMS network 110, VCC 112, S-CSCF 114, HSS 116, I-CSCF 118, CDMA network 120, SCP 122, MSC 124, HLR 126, PSTN 130, and MGCF/MGW 140. IMS network 110, VCC 112, S-CSCF 114, HSS 116, I-CSCF 118, CDMA network 120, SCP 122, MSC 124, HLR 126, PSTN 130, and MGCF/MGW 140 may include the features described above in connection with, for example, FIGS. 1 and 2.

As further shown in FIG. 3, when a call to user device (not shown) associated with IMS network 110 is initiated, a call termination message (e.g., an IAM message) and user device address digits (e.g., a MDN associated with the user device) may be received by MSC 124 (block 305). MSC 124 may send a location request (e.g., an ANSI-41 "LOCREQ" invoke) message to HLR 126 to obtain a routing number (block 310). The ANSI-41 LOCREQ invoke message may include a dialed called party number (e.g., the MDN) received in block 305. HLR 126 may respond, to MSC 124, with an ANSI-41 locreq return result message (block 315). The LOCREQ answer message may include an address of SCP 122. Based on the address of SCP 122, MSC 124 may send an analyzed information request (e.g., an ANSI-41 "ANLYZD" invoke) message to SCP 122 (block 320). The ANLYZD message may include the dialed called party number (e.g., the MDN) received in block 305. SCP 122 may return an analyzed information return result message (e.g., that includes steering digit(s) in front of the MDN as a routing number) to MSC 124 (block 325). MSC 124 may generate an ISUP IAM message with the called party number (CdPN) set to the MDN (e.g., without the steering digits), and may route the ISUP IAM message to MGCF/MGW 140 (e.g., within IMS network 110 of the called party) based on the steering digits received from SCP 122 (block 330).

MGCF/MGW 140 may send a SIP invite message (e.g., that includes a TEL URI or SIP URI generated from the called party number (e.g., the MDN) in the R-URI header and the MGW-SDP) to I-CSCF 118 (block 335). In one exemplary implementation, a session border controller (SBC)/session router (SR) may be deployed between MGCF/MGW 140 and I-CSCF 118 in IMS network 110. The SBC/SR may perform an ENUM dip (e.g., perform a query of an ENUM server) to determine the appropriate I-CSCF address to route the SIP invite message instead of relying on a local configuration of MGCF/MGW 140. I-CSCF 118 may send a LIR message that includes the called party number (e.g., the MDN) to HSS 116 (block 340). In response to the LIR message, HSS 116 may return, to I-CSCF 118, a LIA message that includes the S-CSCF assigned to the called party (block 345). I-CSCF 118 may send a SIP invite message (e.g., containing the TEL URI or SIP URI with the called MDN) to the assigned S-CSCF (e.g., S-CSCF 114), and S-CSCF 114 may route the SIP invite message to VCC 112 (block 350) if VCC 112 is deployed. Upon receiving the SIP invite message, VCC 112 may determine where the call request should be routed (e.g., to IMS network 110 or CDMA network 120) (block 355). The call flow may continue and the call may be delivered to IMS network 110 or to CDMA network 120. S-CSCF 114 may deliver the call to the IMS user in IMS network 110 via a P-CSCF when VCC 112 is not deployed in IMS network 110.

Although FIG. 3 shows exemplary devices/networks of network 100 (e.g., associated with call flow 300), in other implementations, network 100 may contain fewer, different, differently arranged, or additional devices/networks than depicted in FIG. 3. In still other implementations, one or more devices of network 100 may perform one or more other tasks described as being performed by one or more other devices of network 100. FIGS. 4-13 depict exemplary network configurations capable of implementing the concepts described in connection with, for example, FIGS. 1 and 3.

Figure 4:
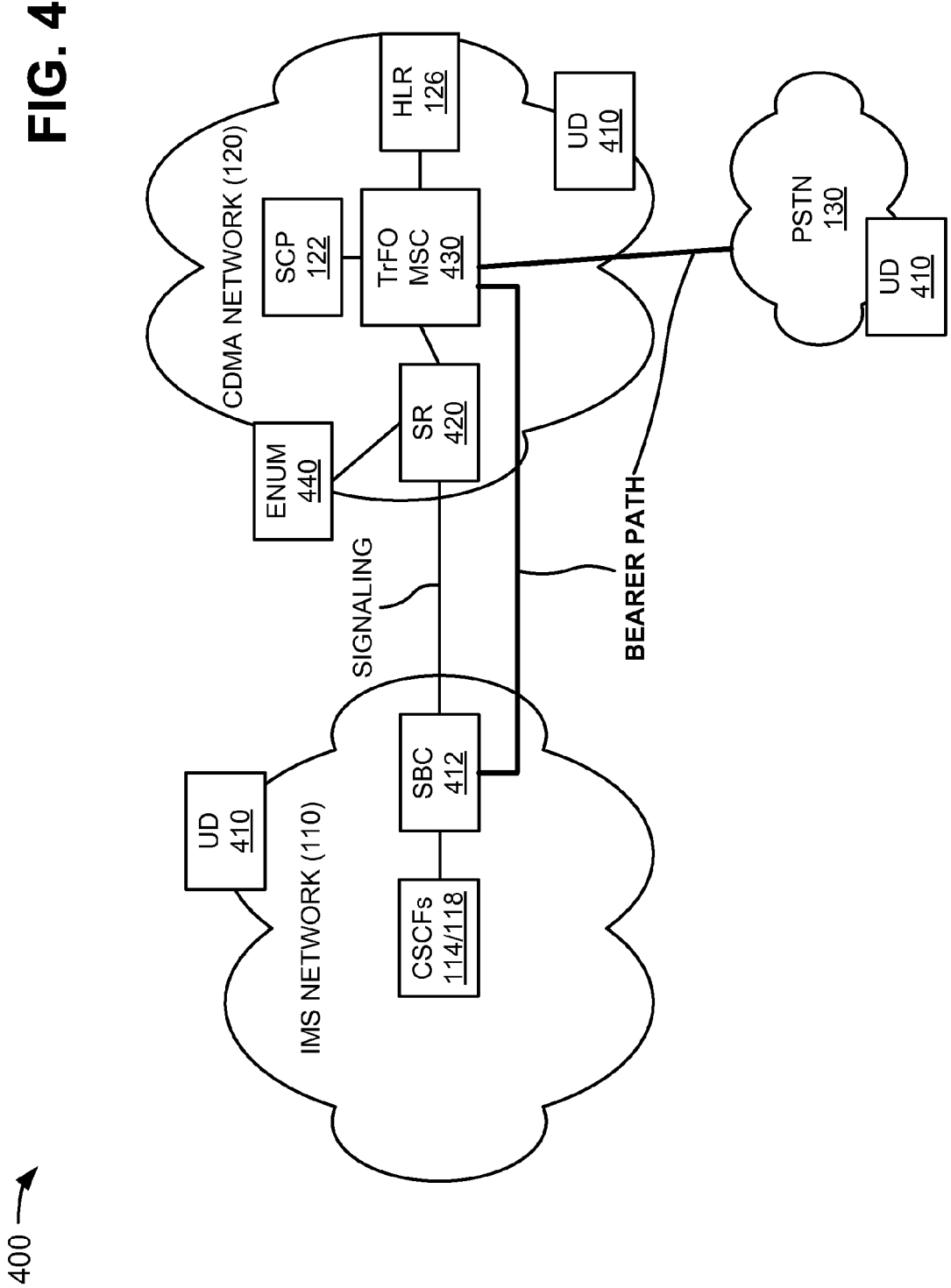
FIG. 4 is a diagram of an exemplary network that receives a call to a MDN homed to a transcoder free operation (TrFO) MSC.

FIG. 4 is a diagram of an exemplary network 400 that receives a call for a MDN assigned to a user device associated with IMS network 110 and homed to a TrFO MSC (e.g., that can perform MGCF/MGW 140 functions supporting SS7 and IP signaling interworking in CDMA network 120). As illustrated, network 400 may include IMS network 110, CSCFs 114/118 (e.g., S-CSCF 114 and I-CSCF 118), CDMA network 120, SCP 122, HLR 126, and PSTN 130. IMS network 110, CSCFs 114/118, CDMA network 120, SCP 122, HLR 126, and PSTN 130 may include the features described above in connection with, for example, FIGS. 1-3. As further shown in FIG. 4, IMS network 110 may be associated with a user device (UD) 410, and may include a session border controller (SBC) 412. CDMA network 120 may be associated with another user device 410, and may include a session router (SR) 420, a TrFO MSC 430, and an ENUM 440. PSTN 130 may be associated with still another user device 410. The devices of network 400 may interconnect via wired and/or wireless connections.

Each of user devices (UD) 410 (also referred to as a user equipment or UE) may include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer (e.g., with a broadband air card), a landline telephone, or other types of communication devices. In an exemplary implementation, each of user devices 410 may include a device that is capable of communicating over IMS network 110, CDMA network, and/or PSTN 130.

SBC 412 may include one or more server devices, or other types of computation or communication devices, that gather, process, search, and/or provide information in a manner described herein. In one exemplary implementation, SBC 412 may exert control over signaling and media streams involved in setting up, conducting, and tearing down telephone calls or other interactive media communications. SBC 412 may support IPv4 and IPv6 interworking and topology hiding functions.

SR 420 may include one or more data transfer devices, such as a gateway, a router, a switch, a firewall, a NIC, a hub, a bridge, a proxy server, or some other type of device that processes and/or transfers data. In one exemplary implementation, SR 420 may perform signaling interworking and may determine a location of I-CSCF 118 for a MDN by querying a ENUM server. SR 420 may be implemented as part of IMS network 110 or may be integrated with SBC 416.

TrFO MSC 430 may include one or more server devices, or other types of computation or communication devices, that gather, process, search, and/or provide information in a manner described herein. In one exemplary implementation, TrFO MSC 430 may include the features described above for MSC 124 (FIGS. 1-3), except that TrFO MSC 430 may perform a transcoder free operation (e.g., transport of compressed speech, from legacy mobile devices, in a packet transport network through the elimination of unnecessary encoding and decoding of the signal by intermediate elements in a bearer path). TrFO MSC 430 may include a MSC that can support SS7 ISUP and IP signaling interwork similar to MGCF/MGW 140. TrFO MSC 430 may support MGCF/MGW 140 functions that require interwork between a circuit mode call with SS7 ISUP signaling and a VoIP call with IP based signaling (e.g., SIP).

ENUM 440 may include one or more server devices, or other types of computation or communication devices, that gather, process, search, and/or provide information in a manner described herein. In one exemplary implementation, ENUM 440 may provide a suite of protocols to unify the telephone numbering system with the Internet addressing system by using an indirect lookup method. For example, ENUM 440 may store information that maps a MDN assigned to user device 410 to an address (e.g., an IP address or a fully qualified domain name (FQDN)) of I-CSCF 118. In an exemplary implementation, ENUM 440 may be part of IMS network 110 instead of CDMA network 120.

In one exemplary implementation, IMS subscribers may be assigned MDNs and their subscriber profiles in HLR 126 may be provisioned with a WIN termination trigger. As a result, calls to IMS subscribers may first be routed to their home MSC (e.g., TrFO MSC 430) in CDMA network 120. When TrFO MSC 430 receives a call for user device 410 (e.g., associated with IMS network 110), TrFO MSC 430 may send a location request (LOCREQ) invoke message to HLR 126, and HLR 126 may return the WIN termination trigger to TrFO MSC 430. TrFO MSC 430 may send, to SCP 122, an analyze information invoke message that includes the received called party number (e.g., of user device 410 associated with IMS network 110). SCP 122 may return, to TrFO MSC 430, the called party number, with steering digits as the prefix, in an analyze information return result message.

Based on the steering digits, TrFO MSC 430 may send the call to an IP trunk group going to the SR 420 (e.g., after removing the steering digits) using Legacy Mobile Station Domain (LMSD) signaling or SIP signaling. SR 420 may perform a query of ENUM 440 using the called party number and may retrieve, from ENUM 440, an address of I-CSCF 118 for user device 410 associated with IMS network 110. SR 420 may provide LMSD/SIP interworking, if required, and may send the call to SBC 412, based on the returned I-CSCF address from ENUM 440. A DNS query may be performed if ENUM 440 returns a FQDN for I-CSCF 118. SBC 412 may provide IPv4/IPv6 interworking and may send the call to I-CSCF 118. I-CSCF 118 may query HSS 116 (not shown)

and may retrieve an address of a S-CSCF (e.g., S-CSCF 114) for user device 410 associated with IMS network 110. I-CSCF 118 may deliver the call to S-CSCF 114, and the call may be delivered to user device 410 (e.g., associated with IMS network 110) by IMS network 110. If user device 410 is allowed to receive services in both IMS network 110 and CDMA network 120, S-CSCF 114 may first send the call to VCC 112 (not shown), which may select either IMS network 110 or CDMA network 120 to deliver the call to user device 410, based on whether user device 410 is registered with IMS network 110 or based on network policy. Otherwise, the call may be delivered by S-CSCF 114 directly to a P-CSCF serving user device 410 for call termination to user device 410.

Although FIG. 4 shows exemplary devices of network 400, in other implementations, network 400 may contain fewer, different, differently arranged, or additional devices than depicted in FIG. 4. In still other implementations, one or more devices of network 400 may perform one or more other tasks described as being performed by one or more other devices of network 400.

Figure 5:
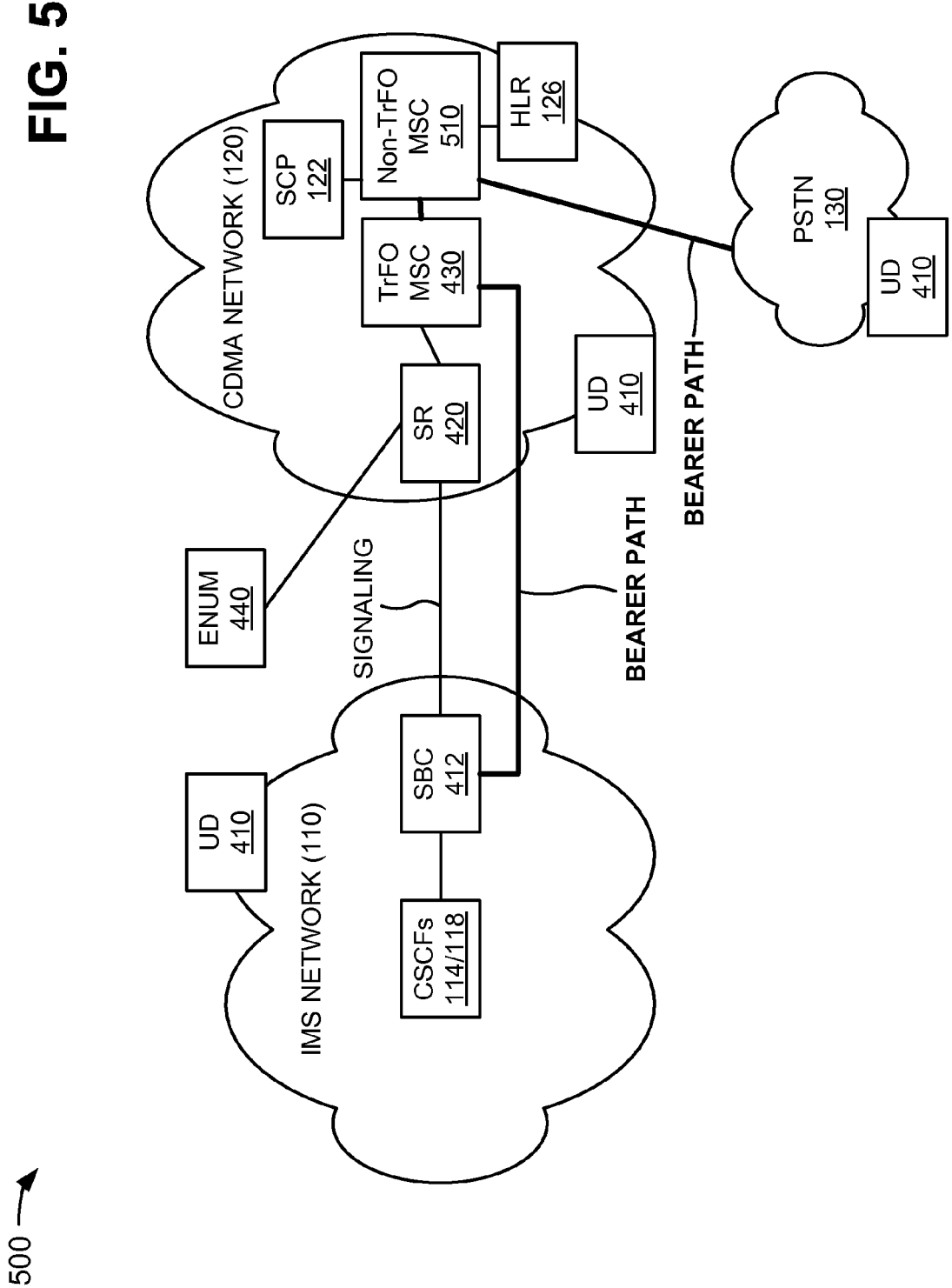
FIG. 5 is a diagram of an exemplary network that receives a call to a MDN homed to a non-TrFO MSC.

FIG. 5 is a diagram of an exemplary network 500 that receives a call to a MDN assigned to user device 410 associated with IMS network 110 and homed to a non-TrFO MSC (e.g., that may not support MGCF/MGW 140 functions for ISUP and IP call interworking). As shown, network 500 may include IMS network 110, CSCFs 114/118, CDMA network 120, SCP 122, HLR 126, PSTN 130, user devices 410, SBC 412, SR 420, TrFO MSC 430, and ENUM 440. IMS network 110, CSCFs 114/118, CDMA network 120, SCP 122, HLR 126, PSTN 130, user devices 410, SBC 412, SR 420, TrFO MSC 430, and ENUM 440 may include the features described above in connection with, for example, FIGS. 1-4. As further shown in FIG. 5, network 500 may include a non-TrFO MSC 510 provided in CDMA network 120. The devices of network 500 may interconnect via wired and/or wireless connections.

Non-TrFO MSC 510 may include one or more server devices, or other types of computation or communication devices, that gather, process, search, and/or provide information in a manner described herein. In one exemplary implementation, non-TrFO MSC 510 may include the features of described above in connection with the TrFO MSC 430 (FIG. 4), except that non-TrFO MSC 510 may not perform a transcoder free operation or support SS7 call and IP (e.g., VoIP) call interworking.

In one exemplary implementation, a call for user device 410 (e.g., associated with IMS network 110) may arrive at non-TrFO MSC 510 with a called party number homed to non-TrFO MSC 510. Non-TrFO MSC 510 may send a location request (e.g., a "LOCREQ") message to HLR 126, and HLR 126 may return a WIN termination trigger to non-TrFO MSC 510. Non-TrFO MSC 510 may send, to SCP 122, an analyze information invoke message that includes the called party number. SCP 122 may return, to non-TrFO MSC 510, the called party number with steering digits as a prefix. Based on the steering digits, non-TrFO MSC 510 may send the call to an ISUP trunk group connected to TrFO MSC 430 (e.g., after removing the steering digits).

TrFO MSC 430 (e.g., providing MGCF/MGW 140 functions) may tandem the call to SR 420 by translation and based on a special incoming trunk group from non-TrFO MSC 510. SR 420 may perform a query of ENUM 440 (e.g., with the called party number), and may retrieve an address of an I-CSCF (e.g., I-CSCF 118) associated with user device 410 (e.g., associated with IMS network 110). SR 420 may route the call to SBC 412 based on the returned I-CSCF address. A DNS query may be performed as needed. SBC 412 may provide IPv4/IPv6 interworking and may send the call to I-CSCF 118. I-CSCF 118 may query HSS 116 (not shown) and may retrieve an address of a S-CSCF (e.g., S-CSCF 114) for user device 410 associated with IMS network 110. I-CSCF 118 may deliver the call to S-CSCF 114, and the call may be delivered to user device 410 (e.g., associated with IMS network 110) by IMS network 110. If user device 410 is allowed to receive services in both IMS network 110 and CDMA network 120, S-CSCF 114 may first send the call to VCC 112 (not shown), which may select either IMS network 110 or CDMA network 120 to deliver the call to user device 410, based on whether user device 410 is registered with IMS network 110 or based on network policy. Otherwise, the call may be delivered by S-CSCF 114 directly to a P-CSCF serving user device 410 for call termination to user device 410.

Although FIG. 5 shows exemplary devices of network 500, in other implementations, network 500 may contain fewer, different, differently arranged, or additional devices than depicted in FIG. 5. In still other implementations, one or more devices of network 500 may perform one or more other tasks described as being performed by one or more other devices of network 500.

Figure 6:
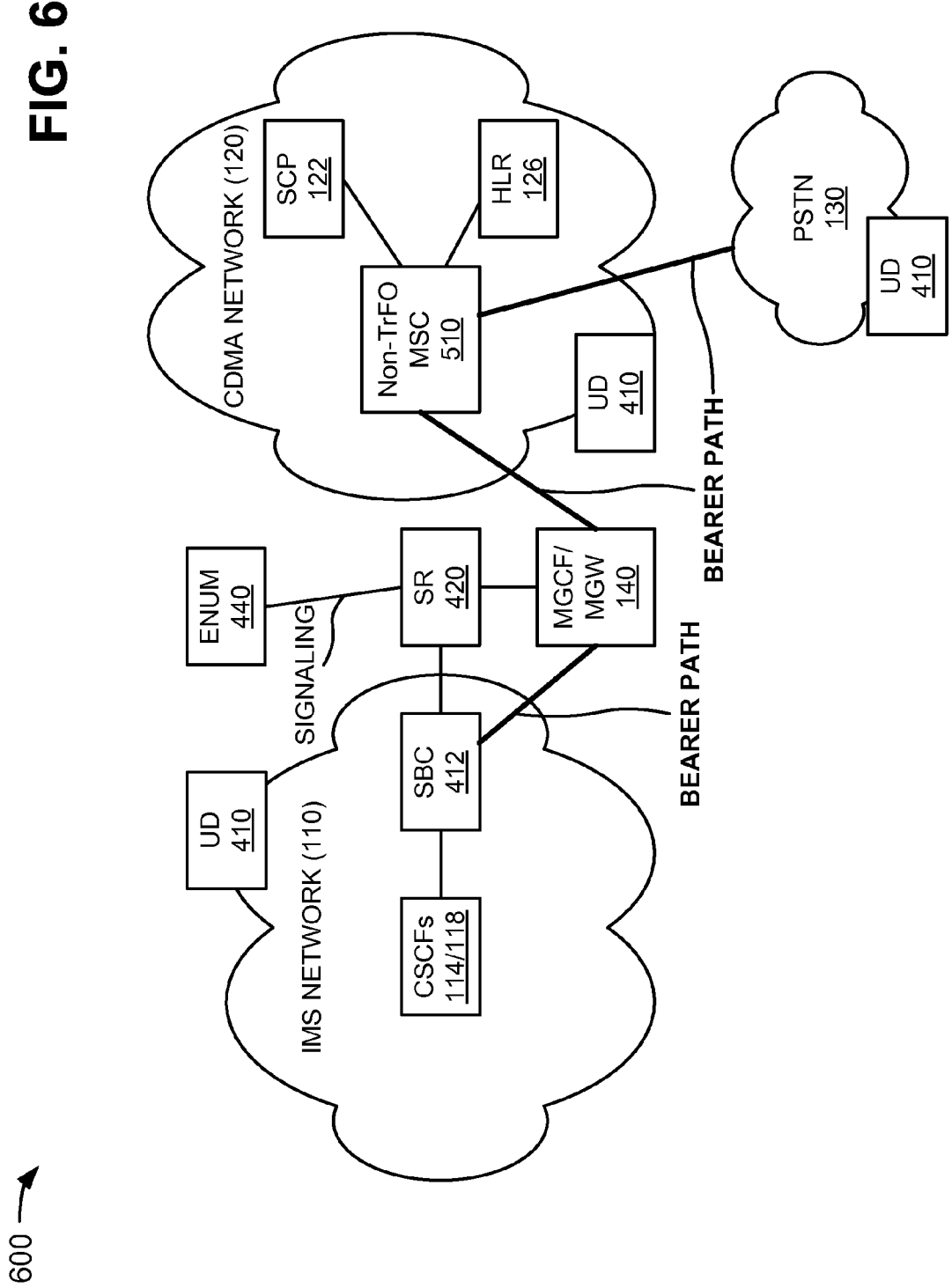
FIG. 6 is a diagram of another exemplary network that receives a call to a MDN homed to a non-TrFO MSC.

FIG. 6 is a diagram of an exemplary network 600 that receives a call for a MDN assigned to user device 410 associated with IMS network 110 and homed to non-TrFO MSC 510 where network 600 may include MGCF/MGW 140 to provide interworking functions for a SS7 ISUP call and a SIP call (e.g., VoIP). As shown, network 600 may include IMS network 110, CSCFs 114/118, CDMA network 120, SCP 122, HLR 126, PSTN 130, MGCF/MGW 140, user devices 410, SBC 412, SR 420, ENUM 440, and non-TrFO MSC 510. IMS network 110, CSCFs 114/118, CDMA network 120, SCP 122, HLR 126, PSTN 130, MGCF/MGW 140, user devices 410, SBC 412, SR 420, ENUM 440, and non-TrFO MSC 510 may include the features described above in connection with, for example, FIGS. 1-5. As further shown in FIG. 6, MGCF/MGW 140 may interconnect SBC 412 and non-TrFO MSC 510. The devices of network 600 may interconnect via wired and/or wireless connections.

In one exemplary implementation, a call for user device 410 (e.g., associated with IMS network 110) may arrive at non-TrFO MSC 510 with a called party number. Non-TrFO MSC 510 may send a location request (e.g., a "LOCREQ") message to HLR 126, and HLR 126 may return a WIN termination trigger to non-TrFO MSC 510. Non-TrFO MSC 510 may send, to SCP 122, an analyze information invoke message that includes the called party number. SCP 122 may return, to non-TrFO MSC 510, the called party number with steering digits as a prefix. Based on the steering digits, non-TrFO MSC 510 may send the call to an ISUP trunk group connected to MGCF/MGW 140 (e.g., after removing the steering digits). MGCF/MGW 140 may provide ISUP/SIP signaling interworking and may send the call to SR 420.

SR 420 may perform a query of ENUM 440 (e.g., with the called party number), and may retrieve an address of an I-CSCF (e.g., I-CSCF 118) associated with user device 410 (e.g., associated with IMS network 110). SR 420 may route the call to SBC 412 based on the returned I-CSCF address. A DNS query may be performed to resolve the I-CSCF address, if needed. SBC 412 may provide IPv4/IPv6 interworking and may send the call to I-CSCF 118. I-CSCF 118 may query HSS 116 (not shown) and may retrieve an address of a S-CSCF (e.g., S-CSCF 114) for user device 410 associated with IMS network 110. I-CSCF 118 may deliver the call to S-CSCF 114, and the call may be delivered to user device 410 (e.g., associated with IMS network 110) by IMS network 110. If user device 410 is allowed to receive services in both IMS network 110 and CDMA network 120, S-CSCF 114 may first send the call to VCC 112 (not shown), which may select either IMS network 110 or CDMA network 120 to deliver the call to user device 410, based on whether user device 410 is registered with IMS network 110 or based on network policy.

Although FIG. 6 shows exemplary devices of network 600, in other implementations, network 600 may contain fewer, different, differently arranged, or additional devices than depicted in FIG. 6. In still other implementations, one or more devices of network 600 may perform one or more other tasks described as being performed by one or more other devices of network 600.

FIGS. 7 and 8 are flow charts of an exemplary process 700 for redirecting a MDN (e.g., homed to a circuit switched network) to an IMS network according to implementations described herein. In one implementation, process 700 may be performed by I-CSCF 118, MSC 124, and MGCF/MGW 140. In another implementation, some or all of process 700 may be performed by another device or group of devices, including or excluding I-CSCF 118, MSC 124, and/or MGCF/MGW 140.

As shown in FIG. 7, process 700 may include receiving, by a MSC, a call for a user device and a MDN associated with the user device (block 710), retrieving, by the MSC and from a HLR, an address of a WIN termination trigger SCP (block 720), and sending, by the MSC and to the SCP, a first message that includes the MDN from the call (block 730). For example, in implementations described above in connection with FIG. 3, when a call to user device associated with IMS network 110 is initiated, a call termination message (e.g., an IAM message) and user device address digits (e.g., a MDN associated with the user device) may be received by MSC 124. MSC 124 may send a location request (e.g., a "LOCREQ") message to HLR 126 to obtain a routing number. The LOCREQ message may include a dialed called party number (e.g., the MDN) previously received by MSC 124. HLR 126 may respond, to MSC 124, with a LOCREQ answer message. The LOCREQ answer message may include an address of SCP 122. Based on the address of SCP 122, MSC 124 may send an analyzed information (e.g., an "ANLYZD") query message to SCP 122. The ANLYZD message may include the dialed called party number (e.g., the MDN).

As further shown in FIG. 7, process 700 may include receiving, by the MSC and from the SCP, a second message with steering digits as a prefix to the MDN (block 740), generating, by the MSC, a third message with a called party number set to the MDN and without the steering digits (block 750), and routing, by the MSC, the third message to a MGCF/MGW of an IMS network based on the steering digits (block 760). For example, in implementations described above in connection with FIG. 3, SCP 122 may return an analyzed information answer message (e.g., that includes steering digit(s) as a prefix to the MDN as a routing number) to MSC 124. MSC 124 may generate an ISUP IAM message with the called party number (CdPN) set to the MDN (e.g., without the steering digits), and may route the ISUP IAM message to MGCF/MGW 140 (e.g., within IMS network 110 of the called party) based on the steering digits received from SCP 122.

Returning to FIG. 7, the MGCF/MGW may send, to an I-CSCF, a SIP invite message that includes a TEL URI or SIP URI generated from the MDN and a MGW-SDP (block 770), the I-CSCF may determine a S-CSCF assigned to the user device based on the MDN (block 780), and the I-CSCF may send the SIP invite message to the S-CSCF, where the S-CSCF delivers the call to the user device via a P-CSCF (block 790). For example, in implementations described above in connection with FIG. 3, MGCF/MGW 140 may send a SIP invite message (e.g., that includes R-URI header with a TEL URI or SIP URI generated from the called party number (e.g., the MDN) and the MGW-SDP) to I-CSCF 118. In one example, a SBC/SR may be deployed between MGCF/MGW 140 and I-CSCF 118 in IMS network 110. The SBC/SR may perform an ENUM dip to determine the appropriate I-CSCF address to route the SIP invite message instead of relying on a local configuration of MGCF/MGW 140 when SBC/SR are unavailable. I-CSCF 118 may send a LIR message that includes the called party number (e.g., the MDN) to HSS 116. In response to the LIR message, HSS 116 may return, to I-CSCF 118, a LIA message that includes the S-CSCF assigned to the called party. I-CSCF 118 may send a SIP invite message (e.g., containing the TEL URI or SIP URI) to the assigned S-CSCF (e.g., S-CSCF 114), and S-CSCF 114 may route the SIP invite message to VCC 112. Upon receiving the SIP invite message, VCC 112 may determine in which domain (e.g., to IMS network 110 or CDMA network 120) that called user is present. The call flow may continue and the call may be delivered to IMS network 110 or to CDMA network 120. In one example, VCC 112 may be omitted if the called user is served only by IMS network 110. In this case, S-CSCF 114 may deliver the call directly to a serving P-CSCF of the called user for call termination.

Process blocks 760/770 may include the process blocks depicted in FIG. 8. As shown in FIG. 8, process blocks 760/770 may include routing, by the MSC, the call to a SR of the IMS network based on the steering digits (block 800), retrieving, by the SR, an address of the I-CSCF associated with the user device based on the MDN (block 810), routing, by the SR, the call to an IMS SBC based on the address of the I-CSCF (block 820), and sending, by the IMS SBC, the call to the I-CSCF (block 830). For example, in implementations described above in connection with FIG. 4, TrFO MSC 430 may tandem the call to SR 420 by translation. SR 420 may perform a query of ENUM 440 (e.g., with the called party number), and may retrieve an address of an I-CSCF (e.g., I-CSCF 118) associated with user device 410 (e.g., associated with IMS network 110). SR 420 may route the call to SBC 412 based on the returned I-CSCF address. SBC 412 may provide IPv4/IPv6 interworking and may send the call to I-CSCF 118.

Implementations described herein may provide systems and/or methods that redirect a call to a MDN (e.g., homed to a circuit switched network) to an IMS network using WIN triggers.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 3, 14, and 15, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a computing device, a call, for a user device associated with an Internet protocol multimedia subsystem (IMS) network, and a mobile directory number (MDN) associated with the user device;
    retrieving, by the computing device and from a home location register (HLR), an address of a wireless intelligent network (WIN) termination trigger service control point (SCP);
    sending, by the computing device and based on the address of the WIN termination trigger SCP, a first message, that includes the MDN, to the WIN termination trigger SCP;
    receiving, by the computing device and from the WIN termination trigger SCP, a second message that includes steering digits and the MDN;
    generating, by the computing device and based on the second message, a third message that is to be routed to a media gateway control function/media gateway (MGCF/MGW) of the IMS network,
        the third message including a called party number that is set to the MDN, and
        the third message omitting the steering digits that are included in the second message and are used to route the third message to the MGCF/MGW; and
    routing, by the computing device and based on the steering digits, the third message to the MGCF/MGW,
        the MGCF/MGW being to further process the call.

2. The method of claim 1, where the computing device comprises a mobile switching center (MSC).

3. The method of claim 1, further comprising:
    sending, by the MGCF/MGW and to an interrogating call/session control function (I-CSCF) of the IMS network, a session initiation protocol (SIP) invite message that includes a request uniform resource identifier (R-URI) header with a telephone uniform resource identifier (TEL URI) or a session initiation protocol uniform resource identifier (SIP URI) generated based on the MDN.

4. The method of claim 3, further comprising:
    determining, by the I-CSCF and based on the MDN, a serving call/session control function (S-CSCF) of the IMS network that is assigned to the user device; and
    sending, by the I-CSCF, the SIP invite message to the S-CSCF,
        the S-CSCF being to deliver the call to the user device.

5. The method of claim 1,
    where the computing device comprises a transcoder free operation (TrFO) mobile switching center (MSC) with integrated MGCF/MGW functions supporting integrated services digital network user part (ISUP) circuit mode call to voice over Internet protocol (VoIP) call interworking, and
    where the method further comprises:
        routing, by the TrFO MSC and based on the steering digits, the call to a session router associated with the IMS network.

6. The method of claim 5, further comprising:
    retrieving, by the session router and based on the MDN, an address of an interrogating call/session control function (I-CSCF) of the IMS network that is assigned to the user device;
    routing, by the session router, the call to a session border controller (SBC) based on the address of the I-CSCF; and
    sending, by the SBC, the call to the I-CSCF.

7. The method of claim 1,
    where the computing device comprises a non-transcoder free operation (non-TrFO) mobile switching center (MSC) without integrated MGCF/MGW functions, and
    where the method further comprises:
        routing, by the non-TrFO MSC and based on the steering digits, the call to a TrFO MSC with integrated MGCF/MGW functions; and
        routing, by the TrFO MSC and based on an incoming trunk group from the non-TrFO MSC, the call to a session router associated with the IMS network.

8. The method of claim 7, further comprising:
    retrieving, by the session router and based on the MDN, an address of an interrogating call/session control function (I-CSCF) of the IMS network that is assigned to the user device;
    routing, by the session router, the call to a session border controller (SBC) based on the address of the I-CSCF; and
    sending, by the SBC, the call to the I-CSCF.

9. The method of claim 1,
    where the computing device comprises a non-transcoder free operation (non-TrFO) mobile switching center (MSC) without integrated MGCF/MGW functions, and
    where the method further comprises:
        routing, by the non-TrFO MSC and based on the steering digits, the call to the MGCF/MGW; and
        routing, by the MGCF/MGW and based on an incoming trunk group from the non-TrFO MSC, the call to a session router associated with the IMS network.

10. The method of claim 9, further comprising:
    retrieving, by the session router and based on the MDN, an address of an interrogating call/session control function (I-CSCF) of the IMS network that is assigned to the user device;
    routing, by the session router, the call to a session border controller (SBC) based on the address of the I-CSCF; and
    sending, by the SBC, the call to the I-CSCF.

11. A device comprising:
    a processor to:
        receive a call for a user device associated with an Internet protocol multimedia subsystem (IMS) network,
        receive a mobile directory number (MDN) associated with the user device,
        send, to a home location register (HLR), a first message that includes the MDN and requests an address of a wireless intelligent network (WIN) termination trigger service control point (SCP),
        receive, from the HLR, the address of the WIN termination trigger SCP,
        send, based on the address of the WIN termination trigger SCP, a second message, that includes the MDN, to the WIN termination trigger SCP,
        receive, from the WIN termination trigger SCP, a third message that includes steering digits and the MDN, generate, based on the third message, a fourth message that is to be routed to a media gateway control function/media gateway (MGCF/MGW) of the IMS network,
  the fourth message including a called party number set to the MDN, and
  the fourth message omitting the steering digits that are included in the third message and are used to route the fourth message to the MGCF/MGW, and
route, based on the steering digits, the fourth message to the MGCF/MGW,
  the MGCF/MGW being to further process the call.

12. The device of claim 11, where the MGCF/MGW sends, to an interrogating call/session control function (I-CSCF) of the IMS network, a session initiation protocol (SIP) invite message that includes a request uniform resource identifier (R-URI) header with a telephone uniform resource identifier (TEL URI) or a session initiation protocol uniform resource identifier (SIP URI) generated from the MDN.

13. The device of claim 12, where:
the I-CSCF determines, based on the MDN, a serving interrogating call/session control function (S-CSCF) of the IMS network that is assigned to the user device,
the I-CSCF sends the SIP invite message to the S-CSCF, and
the S-CSCF delivers the call to the user device.

14. The device of claim 11, where the device comprises one of:
a transcoder free operation (TrFO) mobile switching center (MSC) with integrated MGCF/MGW functions supporting integrated services digital network user part (ISUP) circuit mode call to voice over Internet protocol (VoIP) call interworking, or
a non-TrFO MSC without the integrated MGCF/MGW functions.

15. The device of claim 14,
where, when the device comprises a TrFO MSC, the processor is further to:
  route, based on the steering digits, the call to a session router associated with the IMS network.

16. The device of claim 15, where:
the session router retrieves, based on the MDN, an address of an interrogating call/session control function (I-CSCF) of the IMS network that is assigned to the user device,
the session router routes the call to a session border controller (SBC) based on the address of the I-CSCF,
the SBC sends the call to the I-CSCF, and
the I-CSCF further processes the call.

17. The device of claim 14,
where, when the device comprises a non-TrFO MSC, the processor is further to:
  route, based on steering digits, the call to a TrFO MSC with the integrated MGCF/MGW functions, and
where the TrFO MSC routes, based on an incoming trunk group from the device, the call to a session router associated with the IMS network for further processing.

18. The device of claim 17, where:
the session router retrieves, based on the MDN, an address of an interrogating call/session control function (I-CSCF) of the IMS network that is assigned to the user device,
the session router routes the call to a session border controller (SBC) based on the address of the I-CSCF,
the SBC sends the call to the I-CSCF, and
the I-CSCF further processes the call.

19. The device of claim 14,
where, when the device comprises a non-TrFO MSC, the processor is further to:
  route, based on steering digits, the call to the MGCF/MGW, and
where the MGCF/MGW routes, based on an incoming trunk group from the device, the call to a session router associated with the IMS network for further processing.

20. The device of claim 19, where:
the session router retrieves, based on the MDN, an address of an interrogating call/session control function (I-CSCF) of the IMS network that is assigned to the user device,
the session router routes the call to a session border controller (SBC) based on the address of the I-CSCF,
the SBC sends the call to the I-CSCF, and
the I-CSCF further processes the call.

21. A system comprising:
a mobile switching center (MSC) to:
  receive a call for a user device associated with an Internet protocol multimedia subsystem (IMS) network and a mobile directory number (MDN) associated with the user device,
  retrieve, from a home location register (HLR), an address of a wireless intelligent network (WIN) termination trigger service control point (SCP),
  send, based on the address of the WIN termination trigger SCP, a first message that includes the MDN, to the WIN termination trigger SCP,
  receive, from the WIN termination trigger SCP, a second message that includes steering digits as a prefix to the MDN,
  generate, based on the second message, a third message that is to be routed to a media gateway control function/media gateway (MGCF/MGW) of the IMS network,
    the third message including a called party number set to the MDN, and
    the third message omitting the steering digits that are included in the second message and are used to route the third message to the MGCF/MGW, and
  route, based on the steering digits, the third message to the MGCF/MGW;
the MGCF/MGW being to:
  send, to an interrogating call/session control function (I-CSCF) of the IMS network, a session initiation protocol (SIP) invite message that includes a request uniform resource identifier (R-URI) header with a telephone uniform resource identifier (TEL URI) or a session initiation protocol uniform resource identifier (SIP URI) generated from the MDN; and
the I-CSCF being to:
  determine, based on the MDN, a serving interrogating call/session control function (S-CSCF) of the IMS network that is assigned to the user device, and
  send the SIP invite message to the determined S-CSCF, the S-CSCF delivering the call to the user device.

22. The system of claim 21,
where the MSC includes a transcoder free operation (TrFO) MSC with integrated MGCF/MGW functions to route, based on the steering digits, the call to a session router associated with the IMS network,
where the session router is to:
  retrieve, based on the MDN, an address of the I-CSCF, and
  route the call to a session border controller (SBC) based on the address of the I-CSCF, and
where the SBC is to send the call to the I-CSCF.

23. The system of claim 21,
where the MSC includes a non-transcoder free operation (non-TrFO) MSC without integrated MGCF/MGW functions to route, based on steering digits, the call to a TrFO MSC with integrated MGCF/MGW functions,
where the TrFO MSC is to route, based on an incoming trunk group from the non-TrFO MSC, the call to a session router associated with the IMS network,
where the session router is to:
 retrieve, based on the MDN, an address of the I-CSCF, and
 route the call to a session border controller (SBC) based on the address of the I-CSCF, and
where the SBC is to send the call to the I-CSCF.

24. The system of claim 21,
where the MSC includes a non-transcoder free operation (non-TrFO) MSC to route, based on the steering digits, the call to the MGCF/MGW, and
where the MGCF/MGW is to route, based on an incoming trunk group from the non-TrFO MSC, the call to a session router associated with the IMS network,
where the session router is to:
 retrieve, based on the MDN, an address of the I-CSCF, and
 route the call to a session border controller (SBC) based on the address of the I-CSCF, and
where the SBC is to send the call to the I-CSCF.

* * * * *